(12) United States Patent
Washino

(10) Patent No.: US 10,822,453 B2
(45) Date of Patent: Nov. 3, 2020

(54) WHOLLY AROMATIC LIQUID CRYSTALLINE POLYESTER RESIN, MOLDED ARTICLE, AND ELECTRIC AND ELECTRONIC COMPONENTS

(71) Applicant: ENEOS CORPORATION, Tokyo-to (JP)

(72) Inventor: Gosuke Washino, Tokyo-to (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/314,998

(22) PCT Filed: Jul. 3, 2017

(86) PCT No.: PCT/JP2017/024405
§ 371 (c)(1),
(2) Date: Jan. 3, 2019

(87) PCT Pub. No.: WO2018/008612
PCT Pub. Date: Jan. 11, 2018

(65) Prior Publication Data
US 2019/0202978 A1    Jul. 4, 2019

(30) Foreign Application Priority Data

Jul. 4, 2016 (JP) .................................. 2016-132826
Oct. 18, 2016 (JP) .................................. 2016-204652
Mar. 28, 2017 (JP) .................................. 2017-063452

(51) Int. Cl.
| | | |
|---|---|---|
| C08G 63/60 | (2006.01) | |
| H01B 17/56 | (2006.01) | |
| H01B 3/42 | (2006.01) | |
| B29C 45/00 | (2006.01) | |
| B29K 67/00 | (2006.01) | |

(52) U.S. Cl.
CPC .......... *C08G 63/605* (2013.01); *C08G 63/60* (2013.01); *H01B 3/42* (2013.01); *H01B 3/421* (2013.01); *H01B 17/56* (2013.01); *B29C 45/0001* (2013.01); *B29K 2067/00* (2013.01); *C08G 2250/00* (2013.01)

(58) Field of Classification Search
USPC .................................................. 528/196, 198
See application file for complete search history.

(56) References Cited

U.S. PATENT DOCUMENTS

| | | |
|---|---|---|
| 5,525,700 A | 6/1996 | Samuels et al. |
| 6,815,526 B2 | 11/2004 | Yokota et al. |
| 7,014,921 B2 | 3/2006 | Okamoto et al. |

FOREIGN PATENT DOCUMENTS

| | | |
|---|---|---|
| JP | 8-509020 | 9/1996 |
| JP | 2002-179776 | 6/2002 |
| JP | 2004-250620 | 9/2004 |
| JP | 2005-272810 | 10/2005 |
| JP | 2009-127024 | 6/2009 |
| KR | 10-2013-0012509 | 2/2013 |

OTHER PUBLICATIONS

Extended European Search Report dated Jan. 23, 2020 in corresponding European Patent Application No. 17824215.2.
International Preliminary Report on Patentability dated Jan. 17, 2019 in International Application No. PCT/JP2017/024405.
International Search Report dated Aug. 29, 2017 in International Application No. PCT/JP2017/024405.
Office Action dated Aug. 7, 2018 in corresponding Japanese patent application No. 2018-526381, with Machine Translation.

*Primary Examiner* — Terressa Boykin
(74) *Attorney, Agent, or Firm* — Wenderoth, Lind & Ponack, L.L.P.

(57) ABSTRACT

The present invention provides a wholly aromatic liquid crystalline polyester resin having an excellent heat resistance while having an extremely low dielectric tangent.

14 Claims, 1 Drawing Sheet

WHOLLY AROMATIC LIQUID CRYSTALLINE POLYESTER RESIN, MOLDED ARTICLE, AND ELECTRIC AND ELECTRONIC COMPONENTS

TECHNICAL FIELD

The present invention relates to a wholly aromatic liquid crystalline polyester resin and a molded article, in particular a wholly aromatic liquid crystalline polyester resin having an especially low dielectric tangent, a molded article and electric and electronic components comprising thereof.

BACKGROUND ART

In the recent years, along with the increase of amount of information and communications in the field of telecommunications, the use is increased of signals having frequency of high frequency band in electronic and communication devices, and especially signals are widely used having frequency of gigahertz (GHz) band which the frequency is $10^9$ or more. For example, in the automobile field, high frequency band of GHz band is used. In particular, for millimeter wave radars and quasi-millimeter wave radars loaded for the purpose of crash prevention of the automobiles, there are used high frequency of 76 to 79 GHz and 24 GHz, respectively, and those use are expected to grow further in the future.

However, the higher the frequency of the signal used, the lower becomes the quality of the emission signals which may cause erroneous recognition of information, i.e., the transmission so loss becomes larger. This transmission loss consists of conductor loss due to a conductor and dielectric loss due to a resin for insulation which constitutes the electric and electronic components such as substrates in the electronic and communication devices, and since the conductor loss is proportional to 0.5 power of the frequency used and the dielectric loss to 1 power of the frequency, the effect due to this dielectric loss becomes extremely large in the high frequency band, particularly in the GHz band. In addition, since the dielectric loss also increases in proportion to the dielectric tangent of the resin, a resin having a low dielectric tangent is required for preventing degradation of information.

In relation to the above-described problem, Patent Document 1 proposes a liquid crystalline aromatic polyester comprising 2 or more of a structural unit derived from p- or m-hydroxybenzoic acid and a structural unit derived from hydroxynaphthoic acid as a liquid crystalline aromatic polyester which shows low dielectric tangent in the high frequency band.

The resin which constitutes the electric and electronic components is required to have a high heat resistance to the heat which occurs at the time of molding (film forming stability), and a molded article such as a film by use thereof is required to have a high heat resistance to the heating process in which soldering or the like is used. In relation to such problem, Patent Document 2 proposes a polyester resin comprising 1 to 6% of a structural unit derived from p-hydroxybenzoic acid, 40 to 60% of a structural unit derived from 6-hydroxy-2-naphthoic acid, 17.5 to 30% of a structural unit derived from an aromatic diol compound, and 17.5 to 30% of a structural unit derived from aromatic dicarboxylic acid as a wholly aromatic polyester, excellent in heat resistance and the like.

The wholly aromatic liquid crystalline polyester resin is also widely used in surface mounting electronic components obtainable from injection molding, since it is excellent in heat resistance and thin-wall formability. Since it is also a material having small dielectric loss and excellent electric properties, recently, methods to mold the aromatic liquid crystalline polyester into a film form are reviewed by T-die extrusion process or inflation process, solution cast process and the like.

In relation to the above-described problem, Patent Document 3 proposes an aromatic liquid crystalline polyester consisting of 40-74.8 mol % of repeating structural unit (I) derived from 2-hydroxy-6-naphthoic acid, 12.5-30 mol % of repeating structural unit (II) derived from an aromatic diol compound, 12.5-30 mol % of repeating structural unit (III) derived from 2,6-naphthalene dicarboxylic acid, 0.2-15 mol % of repeating structural unit (IV) derived from terephthalic acid or 4,4'-biphenyl dicarboxylic acid, which the molar ratio of repeating structural units (III) and (IV) satisfy the relationship of: (III)/{(III)+(IV)}≥0.5, as an aromatic liquid crystalline polyester having excellent balance between the heat resistance and film processability and a small conductor loss.

RELATED ART DOCUMENTS

Patent Documents

Patent Document 1 Japanese Unexamined Patent Application Publication No. 2004-250620
Patent Document 2 Japanese Unexamined Patent Application Publication No. 2002-179776
Patent Document 3 Japanese Unexamined Patent Application Publication No. 2005-272810

SUMMARY OF THE INVENTION

Problems to be Solved by the Invention

In the recent years, the amount of information and communication is continuously rapidly growing, the frequency of the signals used is even higher, and a resin is required which has a further low dielectric tangent in the high frequency band. The present inventors have found that even the use of the polyester resin proposed in Patent Document 1 will not show a sufficiently low dielectric tangent that is required in the high frequency band. Likewise, the present inventors have found that even the use of the polyester resin proposed in Patent Document 2 will not show the low dielectric tangent that is required in the high frequency band.

In order to solve the above described technical problems, the present inventors intensively studied to find that a wholly aromatic liquid crystalline polyester resin having a low dielectric tangent and a high heat resistance is obtainable by adjusting the specific structural unit and the specific composition ratio in a wholly aromatic liquid crystalline polyester resin.

Also, the present inventors have found that even by the use of the polyester resin as proposed in Patent Document 3 will not attain sufficient processability into a film or a fiber. In particular, it was found that the melt elongation property is not enough, which guarantees the processability and elongation processability when the resin is melted.

In the recent years, the amount of information communication is continuously rapidly growing, the frequency of the signals used is even higher, and a resin is required having an even lower dielectric tangent in the gigahertz (GHz) band which the frequency is $10^9$ or more. Furthermore, when designing a device or the like by using such resin, a sufficient heat resistance is necessary since in general, heat process of high heat is carried out such as process by soldering. The present inventors have found out that the polyester resin as proposed in Patent Document 1 cannot satisfy both of the sufficiently low dielectric tangent required in the high frequency band of 10 GHz measurement frequency and the sufficient heat resistance.

In order to solve the above described technical problems, the present inventors intensively studied to find that a wholly aromatic liquid crystalline polyester resin having an excellent balance between the heat resistance and processability while having an especially low dielectric tangent is obtainable by adjusting the specific structural unit and the specific composition ratio in a wholly aromatic liquid crystalline polyester resin.

The objective of the present invention is to provide a wholly aromatic liquid crystalline polyester resin having an excellent heat resistance while having a notably low dielectric tangent.

The objective of the present invention is also to provide a wholly aromatic liquid crystalline polyester resin having excellent balance of the heat resistance and processability while having a notably low dielectric tangent.

Further the objective of the present invention is to provide a molded article comprising said wholly aromatic liquid crystalline polyester resin and electric and electronic components comprising molded article.

Means for Solving the Problems

The wholly aromatic liquid crystalline polyester resin according to the present invention comprises, structural unit (I) derived from 6-hydroxy-2-naphthoic acid, structural unit (II) derived from an aromatic diol compound, structural unit (III) derived from an aromatic dicarboxylic compound, wherein structural unit (III) comprises structural unit (III A) derived from terephthalic acid, and at least one of structural unit (III B) derived from 2,6-naphthalene dicarboxylic acid and structural unit (III C) derived from isophthalic acid, wherein the composition ratio (mol %) of said structural units is characterized by satisfying the following conditions:

40 mol %≤structural unit (I)≤80 mol %
10 mol %≤structural unit (II)≤30 mol %
3 mol %≤structural unit (III A)≤28 mol %
0 mol %≤structural unit (III B)≤9 mol %
0 mol %≤structural unit (III C)≤5 mol %
(provided that both of structural unit (III B) and structural unit (III C) is not 0 mol %).

In the first aspect of the present invention, preferably the composition ratio (mol %) of the structural units further satisfies the following conditions:

50 mol %≤structural unit (I)≤80 mol %
10 mol %≤structural unit (II)≤25 mol %
5 mol %≤structural unit (III A)≤25 mol %.

In the first aspect of the present invention, more preferably the composition ratio (mol %) of the structural units further satisfies the following condition:

0 mol %≤structural unit (III B)+structural unit (III C)<5 mol %.

In the second aspect of the present invention, preferably the composition ratio (mol %) of the structural units further satisfies the following conditions:

40 mol %≤structural unit (I)≤75 mol %
12 mol %≤structural unit (II)≤30 mol %
3 mol %≤structural unit (III A)≤28 mol %
2 mol %≤structural unit (III B)≤9 mol %.

In the second aspect of the present invention, more preferably the composition ratio (mol %) of the structural units further satisfies the following conditions:

50 mol %≤structural unit (I)≤70 mol %
15 mol %≤structural unit (II)≤27 mol %
6 mol %≤structural unit (III A)≤24 mol %
3 mol %≤structural unit (III B)≤9 mol %.

In the first and second aspects of the present invention, preferably structural unit (II) is represented by the following formula:

 (II)

wherein $Ar^1$ is selected from the group consisting of phenyl, biphenyl, naphtyl, anthryl, and phenanthryl, optionally having a substituent group.

In the first aspect of the present invention, the molar ratio of structural unit (III A) to the total of structural units (III B) and (III C) (structural unit (III A)/(structural unit (III B)+(III C)) is preferably from 3.2 to 45.

In the first and second aspects of the present invention, the melting point is preferably 300° C. or more.

In the first and second aspects of the present invention, the dielectric tangent in measurement frequency 10 GHz is preferably $0.85 \times 10^{-3}$ or less.

In the second aspect of the present invention, the elongation ratio of a melt strand extruded under the conditions of melting point of the liquid crystalline polyester resin +20° C. and shear rate of 1000 s$^{-1}$ is preferably 10 times or more.

In the second aspect of the present invention, the dielectric tangent in measurement frequency 82 GHz is preferably less than $3.5 \times 10^{-3}$.

In the second aspect of the present invention, preferably the dielectric tangents of 30° C. and 100° C. in measurement frequency of 34 GHz are less than $2.0 \times 10^{-3}$ and less than $4.0 \times 10^{-3}$ respectively.

In the second aspect of the present invention, the rate of change of dielectric tangent from 30° C. to 100° C. in measurement frequency 34 GHz is preferably less than $3.0 \times 10^{-5}/°$ C.

In the second aspect of the present invention, the melt viscosity at a temperature of melting point of the liquid crystalline polyester resin +20° C. and shear rate of 1000 s$^{-1}$ is preferably from 20 to 100 Pa·s.

The molded article according to the present invention is characterized in comprising the above-described wholly aromatic liquid crystalline polyester resin.

In the present invention, the molded article is preferably in a film form.

In the present invention, the molded article is preferably in a fibre form.

In the present invention, the molded article is preferably an injection molded article.

The electric and electronic components according to the present invention are characterized in comprising the above-described molded article.

Effects of the Invention

According to the first aspect of the present invention, it is possible to attain a wholly aromatic liquid crystalline polyester resin having a notably low dielectric tangent and a high melting point by selecting the unit which constitutes the wholly aromatic liquid crystalline polyester resin into a specific structural unit and a specific composition ratio thereof.

Therefore, it is possible to prevent the quality degradation of the emission signals in electric and electronic devices or telecommunication devices which use signals of high frequency when they are processed and molded and used as a product.

The wholly aromatic polyester resin of the present invention also has high film forming stability, and the molded article made by use thereof have high stability against heat processing in which soldering or the like is used.

According to the second aspect of the present invention, it is possible to attain a wholly aromatic liquid crystalline polyester resin having a notably low dielectric tangent, and excellent balance of the heat resistance and processability by selecting the unit which constitutes the wholly aromatic liquid crystalline polyester resin into a specific structural unit and a specific composition ratio thereof. Therefore, it is possible to prevent the quality degradation of the emission signals in electric and electronic devices or telecommunication devices which use signals of high frequency when they are processed and molded and used as a product. The wholly aromatic polyester resin of the present invention is suitable for injection molding and also has high spinnability and film forming stability, and the molded article made by use thereof have high stability against heat processing in which soldering or the like is used.

Figure 1:
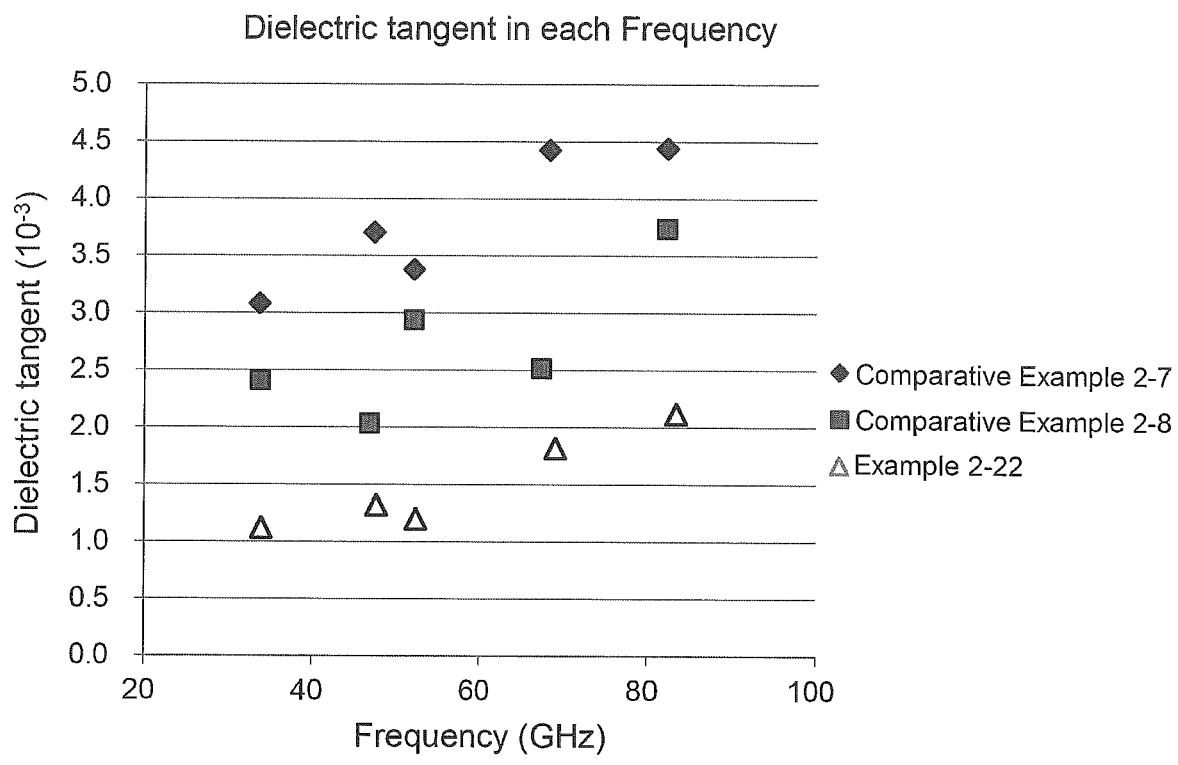
FIG. 1 shows the measured result of the dielectric tangent in various GHz band frequency of the wholly aromatic polyester resin of the second aspect.

MODE FOR CARRYING OUT THE INVENTION (Wholly Aromatic Liquid Crystalline Polyester Resin)

The wholly aromatic liquid crystalline polyester resin according to the present invention comprises structural unit (I) derived from 6-hydroxy-2-naphthoic acid, structural unit (II) derived from an aromatic diol compound, and structural unit (III) derived from an aromatic dicarboxylic compound, wherein structural unit (III) comprises structural unit (III A) derived from terephthalic acid, and at least one of structural unit (III B) derived from 2,6-naphthalene dicarboxylic acid and structural unit (III C) derived from isophthalic acid and satisfies a specific composition ratio. The lower limit of the total structural units from (I) to (III) is preferably 90 mol % or more, more preferably 95 mol % or more as the lower limit and further preferably 99 mol % or more, and the upper limit is preferably 100 mol % or less, based on the structural units of the entire wholly aromatic liquid crystalline polyester resin.

According to the wholly aromatic liquid crystalline polyester resin having such constitution, it is possible to attain a wholly aromatic liquid crystalline polyester resin having a notably low dielectric tangent. Further since the wholly aromatic liquid crystalline polyester resin can have a high melting point, it is possible to enhance the heat resistance against heat processing of the molded article made by the use thereof, along with enhancement of film forming stability.

Since it is also possible to attain a wholly aromatic polyester resin with a high glass transition temperature, the heat resistance in actual use of the molded article by use thereof can be improved, thus use can be made under an environment of higher temperatures.

Moreover, it is possible to lower the volume expansion coefficient, so a wholly aromatic liquid crystalline polyester resin can be attained having high dimension stability at the time of molding and processing.

In the first aspect of the present invention, the dielectric tangent (measurement frequency: 10 GHz) of the wholly aromatic liquid crystalline polyester resin is preferably $0.85 \times 10^{-3}$ or less, more preferably $0.80 \times 10^{-3}$ or less, and further preferably $0.75 \times 10^{-3}$ or less.

In the present specification, the dielectric tangent of the wholly aromatic liquid crystalline polyester resin can be measured by split post dielectric resonator method (SPDR method) by means of Network Analyzer N5247A from Keysight Technoligies.

In the first aspect of the present invention, the lower limit of the melting point of the wholly aromatic liquid crystalline polyester resin is preferably 320° C. or more, more preferably 325° C. or more, further preferably 330° C. or more, and the upper limit is preferably 390° C. or less, more preferably 370° C. or less. By selecting the melting point of the wholly aromatic liquid crystalline polyester resin according to the present invention within the above-described numerical range, it is possible to enhance the heat resistance against heat processing of the molded article made by the use thereof, along with enhancement of film forming stability.

In the second aspect of the present invention, the lower limit of the melting point of the wholly aromatic liquid crystalline polyester resin is preferably 300° C. or more, more preferably 305° C. or more, further preferably 310° C. or more, and the upper limit is preferably 350° C. or less, more preferably 345° C. or less, further preferably 340° C. or less. By selecting the melting point of the wholly aromatic liquid crystalline polyester resin according to the present invention within the above-described numerical range, it is possible to enhance the heat resistance against heat processing of the molded article made by the use thereof, along with enhancement of film forming stability and spinnability stability.

In the present specification, the melting point of the wholly aromatic liquid crystalline polyester resin is in accordance with ISO11357, ASTM D3418 test method and can be measured by using a differential scanning calorimeter (DSC) manufactured by Hitachi High-Tech Science Corporation or the like.

In the first aspect of the present invention, the glass transition temperature of the wholly aromatic liquid crystalline polyester resin is preferably 120° C. or more and more preferably 125° C. or more.

By selecting the glass transition temperature of the wholly aromatic liquid crystalline polyester resin of the present invention within the above-described numerical range, the heat resistance of the molded article can be enhanced which is made by use of the wholly aromatic polyester resin according to the present invention and used in electronic devices and telecommunications devices or the like, therefore, use under a higher temperatured environment can be attained.

In the present specification, the glass transition temperature of the wholly aromatic liquid crystalline polyester resin is in accordance with JISK7244 and can be obtained from a peak top temperature of tan D obtainable from dynamic viscoelasticity measurement by use of a dynamic viscoelasticity measuring device (manufactured by Hitachi High-Tech Science Corporation, product name: DMA7100) or the like).

In the first aspect of the present invention, the volume expansion coefficient of the wholly aromatic liquid crystalline polyester resin is preferably 250 ppm/° C. or less, more preferably 240 ppm/° C. or less, and more preferably 230 ppm/° C. or less, in view of the dimension stability at the time of molding.

In the present specification, the volume expansion coefficient of the wholly aromatic liquid crystalline polyester resin can be measured using a thermomechanical analyzing device (manufactured by Hitachi High-Tech Science Corporation, product name: TMA7000) from a molded article obtained from heat melting and injection molding or press molding, film molding the resin.

In the first aspect of the present invention, the lower limit of the melt viscosity of the liquid crystalline polyester resin at the melting point of the liquid crystalline polyester resin+20° C. and shear rate of 1000 s$^{-1}$ is preferably 1 Pa·s or more and more preferably 5 Pa·s, and the upper limit is preferably 500 Pa·s or less and more preferably 450 Pa·s or less, in view of formability.

In the second aspect of the present invention, the lower limit of the melt viscosity of the liquid crystalline polyester resin at the melting point of the liquid crystalline polyester resin+20° C. and shear rate of 1000 s$^{-1}$ is preferably 20 Pa·s or more and more preferably 30 Pa·s or more, and the upper limit is preferably 100 Pa·s or less and more preferably 90 Pa·s or less, in view of formability.

In the present specification, the viscosity of the wholly aromatic liquid crystalline polyester resin can be measured using a capillary rheometer viscometer, in accordance with JIS K7199.

The wholly aromatic liquid crystalline polyester resin of the second aspect of the present invention can provide a stable processability into a fiber or a film as it has a sufficient melt elongation property. Also, a wholly aromatic liquid crystalline polyester resin having a notably low dielectric tangent can be obtained. Further, since it is possible to obtain a wholly aromatic liquid crystalline polyester resin having a high melting point, the molded article made by use thereof can attain high heat stability to heat processing.

In the second aspect of the present invention, since a wholly aromatic polyester resin having a high glass transition temperature can be obtained, the heat resistance in actual use of the molded article made by the use thereof can be enhanced, and use under a higher temperature environment can be attained. Further, the volume expansion coefficient can be reduced so that a wholly aromatic liquid crystalline polyester resin can be attained having a high dimension stability at the time of molding and processing.

In the second aspect of the present invention, the melt elongation property of the liquid crystalline polyester resin can be evaluated by measuring the elongation ratio of the melt strand. With respect to the melt elongation property of the liquid crystalline polyester resin according to the present invention, the elongation ratio (=withdrawing rate at the end of measurement (m/min)/extrusion rate converted at capillary passing (m/min)) of the melt strand when the melt strand which was extruded under the conditions of the melting point of the liquid crystalline polyester resin+20° C. and shear rate of 1000 s$^{-1}$ was withdrawn while accelerating the withdrawing rate by a winding roller via a pulley is preferably 10 times or more, and more preferably 15 times or more, in view of processability into a fiber or a film. In the present specification, the melt elongation property of the wholly aromatic liquid crystalline polyester resin can be measured by using CAPILOGRAPH 1D manufactured by Toyo Seiki Seisaku-sho., Ltd.

The tensile force (=melt tensile force) of the melt strand at the end point of the above-described measurement is preferably 1 mN or more, more preferably 3 mN or more, and further preferably 5 mN or more, in view of processability into a fiber or a film.

In the second aspect of the present invention, the dielectric tangent (measurement frequency: 10 GHz) of the wholly aromatic liquid crystalline polyester resin is preferably $0.75 \times 10^{-3}$ or less, more preferably $0.70 \times 10^{-3}$ or less, and further preferably $0.65 \times 10^{-3}$ or less.

The dielectric tangent (measurement frequency: 82 GHz) of the wholly aromatic liquid crystalline polyester resin is preferably less than $3.5 \times 10^{-3}$, more preferably less than $3.0 \times 10^{-3}$, and further preferably less than $2.5 \times 10^{-3}$.

The dielectric tangents (measurement frequency: 34 GHz) at 30° C. and 100° C. of the wholly aromatic liquid crystalline polyester resin are preferably less than $2.0 \times 10^{-3}$ and less than $4.0 \times 10^{-3}$, more preferably less than $1.5 \times 10^{-3}$ and less than $3.0 \times 10^{-3}$, and further preferably less than $1.2 \times 10^{-3}$ and less than $2.0 \times 10^{-}$, respectively.

The rate of change of the dielectric tangent from 30° C. to 100° C. in measurement frequency 34 GHz is preferably less than $3.0 \times 10^{-5}/°$ C., more preferably less than $2.0 \times 10^{-5}/°$ C., and further preferably less than $1.5 \times 10^{-5}/°$ C.

In the present specification, the dielectric tangent in 10 GHz of the wholly aromatic liquid crystalline polyester resin can be measured by the split post dielectric resonator method (SPDR method) by using network analyzer N5247A from Keysight Technologies or the like. Other dielectric tangent can be measured by cylindrical cavity resonator method. Unless particularly specified, the value of the dielectric tangent is the measured value at 23° C., under ambient atmosphere, at humidity of 60%.

The liquid crystallinity of the wholly aromatic liquid crystalline polyester resin of the present invention can be confirmed by observing the presence/absence of optical anisotropy after heat melting the wholly aromatic liquid crystalline polyester resin on the microscope heating stage by using a polarizing microscope manufactured by Olympus Corporation (product name: BH-2) with a microscope heating stage manufactured by Mettler (product name: FP82HT).

Each structural unit comprised in the wholly aromatic liquid crystalline polyester resin is explained below.

(Structural Unit (I) Derived from 6-Hydroxy-2-Naphthoic Acid)

The wholly aromatic liquid crystalline polyester resin comprises structural unit (I) derived from 6-hydroxy-2-naphthoic acid which is expressed by formula (I) described below, and the composition ratio (mol %) of structural unit (I) in the wholly aromatic liquid crystalline polyester resin is 40 mol % or more and 80 mol % or less.

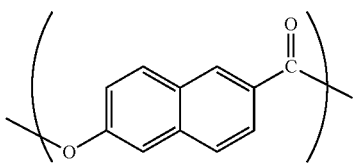
(I)

Monomer which gives structural unit (I) include 6-hydroxy-2-naphthoic acid (HNA, formula (1) as described below), acetylated product, ester derivative, acid halide thereof, or the like.

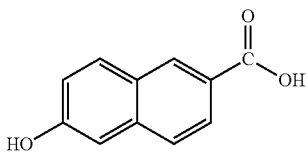
(1)

In the first aspect of the present invention, the lower limit of the composition ratio (mol %) of structural unit (I) in the wholly aromatic liquid crystalline polyester resin is 50 mol % or more, preferably 51 mol % or more, more preferably 52 mol % or more, further more preferably 54 mol % or more, and most preferably 55 mol % or more, and the upper limit is 75 mol % or less, preferably 70 mol % or less, more preferably 65 mol % or less, further more preferably 63 mol % or less, most preferably 60 mol % or less, in view of reducing the dielectric tangent and improving the melting point of the wholly aromatic liquid crystalline polyester resin.

In the second aspect of the present invention, the lower limit of the composition ratio (mol %) of structural unit (I) in the wholly aromatic liquid crystalline polyester resin is 40 mol % or more, preferably 45 mol % or more, more preferably 50 mol % or more, and further preferably 55 mol % or more, and the upper limit is 75 mol % or less, preferably 70 mol % or less, more preferably 65 mol % or less, and further preferably 60 mol % or less, in view of reducing the dielectric tangent and elevating the melting point of the wholly aromatic liquid crystalline polyester resin.

(Structural Unit (II) Derived from Aromatic Diol Compound)

The wholly aromatic liquid crystalline polyester resin comprises structural unit (II) derived from an aromatic diol compound, and the composition ratio (mol %) of structural unit (II) in the liquid crystalline polyester is 10 mol % or more and 30 mol % or less. The wholly aromatic liquid crystalline polyester resin may comprise two or more of structural units (II).

In one embodiment, structural unit (II) is represented by the following formula

(II)

$Ar^1$ in the above-described formula is selected from the group consisting of phenyl, biphenyl, naphtyl, anthryl, and phenanthryl, optionally having a substituent group. Amongst these, phenyl and biphenyl are more preferable. The substituent group includes hydrogen, an alkyl group, an alkoxy group, and fluorine or the like. Number of carbons which the alkyl group has is preferably from 1 to 10 and more preferably from 1 to 5. The alkyl group may be straight chained or branched. Preferably, the alkoxy group has 1 to 10 carbons and more preferably 1 to 5 carbons.

Monomer which gives structural unit (II) are for example, hydroquinone (HQ, formula (2) as below), 4,4-dihydroxybiphenyl (BP, formula (3) as below), 3,3'-dimethyl-1,1'-biphenyl-4,4'-diol (OCBP, formula (4) as below) and the acylated products thereof or the like.

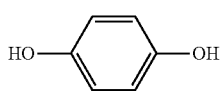
(2)

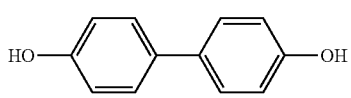
(3)

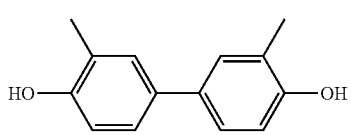
(4)

In the first aspect of the present invention, the lower limit of the composition ratio (mol %) of structural unit (I) in the wholly aromatic liquid crystalline polyester resin is 10 mol % or more, preferably 12.5 mol % or more, more preferably 15 mol % or more, further preferably 17.5 mol % or more, especially preferably 18.5 mol % or more, and most preferably 20 mol % or more, and the upper limit is 24.5 mol % or less, preferably 24 mol % or less, more preferably 23 mol % or less, further more preferably 22.5 mol % or less, most preferably 22.5 mol % or less, in view of reducing the dielectric tangent and elevating the melting point of the wholly aromatic liquid crystalline polyester resin.

In the first aspect of the present invention, the lower limit of the composition ratio (mol %) of structural unit (II) in the wholly aromatic liquid crystalline polyester resin is 12 mol % or more, preferably 15 mol % or more, more preferably 17 mol % or more, further preferably 20 mol % or more, and the upper limit is preferably 27 mol % or less, more preferably 25 mol % or less, further preferably 23 mol % or less, in view of reducing the dielectric tangent and elevating the melting point of the wholly aromatic liquid crystalline polyester resin.

(Structural Unit (III) Derived from Aromatic Dicarboxylic Compound)

Structural unit (III) derived from an aromatic dicarboxylic compound in the wholly aromatic liquid crystalline polyester resin comprises structural unit (III A) derived from terephthalic acid represented by formula (III A) as below, and at least one of structural unit (III B) derived from 2,6-naphthalene dicarboxylic acid and structural unit (III C) derived from isophthalic acid.

The composition ratio (mol %) of structural unit (III) in the liquid crystalline polyester satisfies the following condition:

10 mol %≤structural unit (III)≤30 mol %, and the composition ratio of structural unit (III) is preferably substantially in equivalent amount to the composition ratio of structural unit (II) (structural unit (III)≈structural unit (II)).

The composition ratio (mol %) of structural unit (III) in the liquid crystalline polyester satisfies the following conditions:

3 mol % ≤ structural unit (III A) ≤ 28 mol %

0 mol % ≤ structural unit (III B) ≤ 9 mol %

0 mol % ≤ structural unit (III C) ≤ 5 mol %

(provided that both of structural unit (III B) and structural unit (III C) is not 0 mol %).

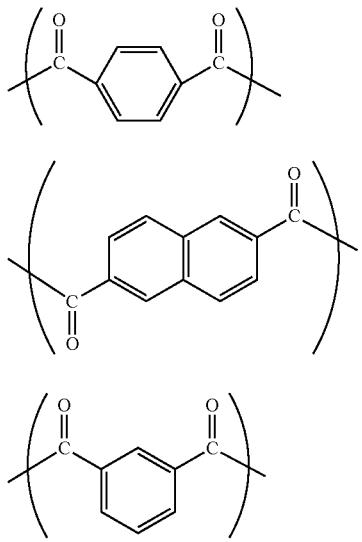

Monomers which give structural unit (III A) are terephthalic acid (TPA, formula (5) as below), ester derivatives thereof, acid halide, or the like. TPA and other derivatives are used widely as a raw material for general plastics such as polyethylene terephthalate, and since they are of the lowest cost class amongst the aromatic dicarboxylic compound, cost superiority of the resin products can be enhanced by increasing the composition ratio of structural unit (III A) in structural unit (III). Therefore, in view of costs, the composition ratio (mol %) of structural unit (III) preferably satisfies: structural unit (III A)>(structural unit (III B)+structural unit (III C)). By increasing the composition ratio of structural unit (III A) in structural unit (III), improvement in the heat resistance can also be expected.

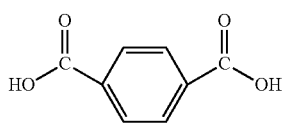

Monomers which give structural unit (III B) are 2,6-naphthalene dicarboxylic acid (NADA, formula (6) as below), and ester derivatives thereof, acid halide, or the like. Since the cost of NADA is higher than TPA, cost superiority of the resin products can be enhanced by decreasing the composition ratio of structural unit (III B) in structural unit (III).

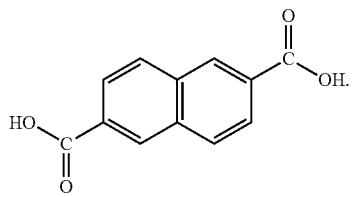

Monomers which give structural unit (III C) are isophthalic acid (IPA, formula (7) as below) and ester derivatives thereof, acid halide, or the like.

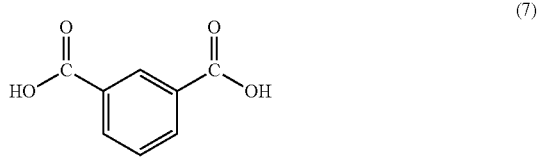

In the first aspect of the present invention, the lower limit of the composition ratio (mol %) of structural unit (IIIA) in the wholly aromatic liquid crystalline polyester resin is 5 mol %, preferably 5.5 mol % or more, more preferably 8 mol % or more, further preferably 10.5 mol % or more, further preferably 13 mol % or more, especially preferably 14 mol % or more, and most preferably 15.5 mol % or more, and the upper limit is less than 25 mol %, preferably 24.5 mol % or less, more preferably 23.5 mol % or less, further more preferably 22.5 mol % or less, and most preferably 22 mol % or less, in view of reducing the dielectric tangent and elevating the melting point of the wholly aromatic liquid crystalline polyester resin.

The lower limit of the composition ratio (mol %) of structural unit (III B) in the wholly aromatic liquid crystalline polyester resin is more than 0 mol %, and preferably 0.5 mol % or more, and the upper limit is less than 5 mol % and preferably 4.5 mol % or less.

The lower limit of the composition ratio (mol %) of structural unit (III C) in the wholly aromatic liquid crystalline polyester resin is 0 mol % or more, preferably more than 0 mol %, more preferably 0.5 mol % or more, and the upper limit is less than 5 mol % and preferably 4.5 mol % or less.

The lower limit of the composition ratio (mol %) of the total of structural unit (III B) and structural unit (III C) in the wholly aromatic liquid crystalline polyester resin is more than 0 mol % and preferably 0.5 mol % or more, and the upper limit is less than 5 mol % and preferably 4.5 mol % or less.

In the wholly aromatic polyester resin, preferably the molar ratio of structural unit (III A) to the total of structural unit (III B) and (III C) (structural unit (IIIA)/(structural unit (III B)+(III C)) is 3.2 or more, more preferably 4 or more, and further preferably 5 or more. Also, such molar ratio is preferably 45 or less, more preferably 40 or less, further preferably 30 or less, further more preferably 20 or less. By selecting the molar ratio of structural unit (III A) to the total of structural unit (III B) and (III C) within the the above-described numerical range, the volume expansion coefficient can be reduced and also the melting point can be elevated of the wholly aromatic polyester resin.

In the second aspect of the present invention, the lower limit of the composition ratio (mol %) of structural unit (IIIA) in the wholly aromatic liquid crystalline polyester resin is 3 mol %, preferably 6 mol % or more, more preferably 8 mol % or more, further preferably 11 mol % or more, and the upper limit is 28 mol % or less, preferably 25 mol % or less, more preferably 23 mol % or less, and further preferably 21 mol % or less, in view of reducing the dielectric tangent and elevating the melting point of the wholly aromatic liquid crystalline polyester resin.

The lower limit of the composition ratio (mol %) of structural unit (IIIB) in the wholly aromatic liquid crystalline polyester resin is 2 mol % or more, preferably 3 mol % or more, more preferably 4.5 mol % or more, and further preferably 5 mol % or more and the upper limit is 9 mol % or less.

The lower limit of the composition ratio (mol %) of structural unit (IIIC) in the wholly aromatic liquid crystalline polyester resin is 0 mol % or more, preferably more than 0 mol % and more preferably 0.5 mol % or more, the upper limit is less than 5 mol % and preferably 4.5 mol % or less.

In the wholly aromatic polyester resin, preferably the lower limit of the molar ratio of structural unit (III A) to structural unit (III B) (structural unit (III A)/structural unit (III B)) is preferably 0.5 or more, more preferably 1.0 or more, further preferably 1.5 or more, and further more preferably 2.0 or more, and the upper limit is preferably 8.0 or less, more preferably 7.0 or less, and further preferably 5.0 or less.

(Method for Manufacturing Wholly Aromatic Liquid Crystalline Polyester Resin)

The wholly aromatic liquid crystalline polyester resin according to the present invention can be prepared by polymerization of monomers giving structural units (I) to (IV), using conventional known methods such as melt polymerization, solid state polymerization, solution polymerization, and slurry polymerization.

In one embodiment, the wholly aromatic liquid crystalline polyester resin according to the present invention can be prepared by melt polymerization only. Preparation is also possible by a two-stage polymerization, in which melt polymerization is carried out to give a prepolymer which is further subjected to solid state polymerization.

In view of obtaining the polyester compound according to the present invention in an efficient manner, the melt polymerization is preferably carried out by combining the monomers giving the above-described structural units (I) to (IV) in a given blend to 100 mol %, in the presence of 1.05 to 1.15 mol equivalent of acetic anhydride based on the total hydroxyl groups which the monomers have and under acetic acid reflux.

When polymerization reaction is performed by the two-stage of melt polymerization followed by solid state polymerization, preference is made to select the method in which, for example, the prepolymer obtained by melt polymerization is cooled and solidified, subsequently triturated into a powder form or flake form, and then by a known solid state polymerization method, for example under an inert atmosphere such as nitrogen or vacuum, at a temperature range from 200 to 350° C., the prepolymer resin is heat processed for 1 to 30 hours. The solid state polymerization may be carried out while stirring or in a static state without stirring.

In the polymerization reaction, a catalyst may be or may not be used. The catalyst used can be those conventionally known as the catalyst for polymerization of polyester, including metal salt catalysts such as magnesium acetate, tin (I) acetate, tetrabutyl titanate, lead acetate, sodium acetate, potassium acetate, antimony trioxide, and organic compound catalysts such as nitrogen containing heterocyclic compounds such as N-methyl imidazole. The amount of catalysts used is preferably, without particular limitation, 0.0001 to 0.1 parts by weight based on the total amount of 100 parts by weight of the monomers.

The polymerization reactor used in the melt polymerization is preferably, without particular limitation, a reactor used for reaction of a general highly viscous fluid. Examples of these reactors include, for example, anchor type, multi-stage type, spiral band type, spiral shaft type, or the like, or variations thereof which are stirring tank type polymerization reactors having stirring units with stirring blades of various shapes, or mixing devices which are generally used for kneading resins such as a kneader, a roll mill, a bunbury mixer, or the like.

(Molded Article)

The molded article according to the present invention is those comprising the wholly aromatic liquid crystalline polyester resin, and the shape thereof is appropriately changed in accordance with the purposes, examples being, without particular limitation, a film form, a plate form, a fiber form, or the like.

The molded article according to the present invention may comprise other resin than the wholly aromatic liquid crystalline polyester resin, as long as the effect of the present invention is not compromised. Examples include, polyester resins such as polyethylene terephthalate, polyethylene naphtalate, polyarylate, and polybutyrene terephthalate, polyolefin resin such as polyethylene and polypropylene, vinyl resins such as cycloolefin polymer and polyvinylchloride, (meth) acryl resins such as polyacrylate, polymethacrylate, and polymethyl methacrylate, polyphenylene ether resin, polyacetal resin, polyamide resin, imide resins such as polyimide and polyether imide, polystyrene resins such as polystyrene, high-impact polystyrene, AS resin and ABS resin, thermosetting resin such as epoxy resin, cellulose resin, polyether ether ketone resin, fluorine resin and polycarbonate resin, and the molded article may comprise one or two or more of these.

The molded article according to the present invention may comprise other additives, for example, a colorant, a dispersing agent, an antioxidant, a curing agent, a flame retardant, a heat stabilizer, a UV absorber, an antistatic agent, and a surfactant, as long as the effect of the present invention is not compromised.

The molded article according to the present invention can be obtained by subjecting a mixture comprising the wholly aromatic liquid crystalline polyester resin and optionally other resins or additives to press molding, foam molding, injection molding, extrusion molding, and punch molding.

The mixture can be obtained by melt kneading the wholly aromatic liquid crystalline polyester resin, etc., by using a banbury mixer, a kneader, a single or twin screw extruder, or the like.

In one embodiment, the molded article is preferably in a film form. The film can be obtained by a conventionally known method, for example, extrusion molding such as inflation molding and melt extrusion molding, and melt casting method. The film thus obtained may be a single layered film consisted of the wholly aromatic liquid crystalline polyester resin, or may be a multi-layered film with different kinds of materials.

The molded films by melt extrusion or solution casting may be subjected to elongation process in a single or twin screw, for the purpose of improving the dimension stability and mechanical property. Thermal process may be carried out for the purpose of removing anisotropy or improving the heat resistance of the film.

In one embodiment, the molded article is preferably in a fiber form. Fibers can be obtained by conventionally known methods such as by melt spinning method, solution spinning method or the like. The fibers can be made of the wholly aromatic liquid crystalline polyester resin only, or mixed with other resins.

(Electric and Electronic Components)

The electric and electronic components according to the present invention comprise the above-described wholly aromatic liquid crystalline polyester resin. Examples of the electric and electronic components include ETC, GPS, wireless LAN and antennas used in electrical and electronic devices such as mobile phones, a high-speed transmission connector, a CPU socket, a circuit board, a flexible printed circuit board (FPC), a circuit board for lamination, a millimeter wave or a quasi-millimeter radar such as a radar for collision prevention, RFID tag, a condenser, an inverter part, an insulation film, a coating material for a cable, an insulation material of battery accumulator such as lithium-ion battery, a vibrating plate of a speaker, or the like.

In one embodiment, the electric and electronic components comprise a molded article (e.g., an injection molded article or a film, etc.) which comprises the wholly aromatic liquid crystalline polyester resin.

EXAMPLE

In the followings, the present invention will be described in more details by the Examples; however, the present invention so shall not be limited to the Examples.

To begin with, the first embodiment of the present invention will be described in details with the aid of the Examples and Comparative Examples.

Preparation of Holly Aromatic Liquid Crystalline Polyester Resin

Example 1-1: Synthesis of Wholly Aromatic Liquid Crystalline Polyester Resin A

To a polymerization vessel with a stirring blade, 203.24 g (60 mol %) of 6-hydroxy-2-naphthoic acid (HNA), 67.03 g (20 mol %) of 4,4-dihydroxybiphenyl (BP), 53.83 g (18 mol %) of terephthalic acid (TPA), and 5.98 g (2 mol %) of isophthalic acid (IPA) were added, and potassium acetate and magnesium acetate were feeded as the catalyst, and after carrying out nitrogen substitution by reducing the pressure of the polymerization vessel and injecting nitrogen for 3 times, 198.46 g (1.08 mol equivalent based on a hydroxyl group) of acetic anhydride was further added, the temperature elevated to 150° C., and acetylation reaction was performed for 2 hours in a reflux state.

After acetylation has ended, the polymerization vessel in a state of which acetic acid was distilled out was heated at 0.5° C./min, and the polymerization product was taken out when the temperature of the melt product in the vessel reached 310° C., and cooled to solidify. The obtained polymerization product was triturated into the size which will pass through a sieve having a sieve opening of 2.0 mm to obtain a prepolymer.

Then, the prepolymer obtained as above was heated from so room temperature to 310° C. over 14 hours by using a heating machine with an oven manufactured by Yamato Scientific Co., Ltd, and subsequently, the temperature was kept at 310° C. for 2 hours and solid state polymerization was performed. Subsequently, heat was naturally released at room temperature to obtain wholly aromatic liquid crystalline polyester resin A. Wholly aromatic liquid crystalline polyester resin A specimen was heat melted on a microscope heating stage by using a polarization microscope manufactured by Olympus Corporation (product name: BH-2) with a hot stage for microscopes manufactured by Mettler (product name: FP82HT) to confirm liquid crystallinity by the presence/absence of optical anisotropy.

Example 1-2: Synthesis of Wholly Aromatic Liquid Crystalline Polyester Resin B

Liquid crystalline polyester resin B was obtained in a similar manner as Example 1-1, except that the monomer feed was changed to HNA 60 mol %, BP 20 mol %, TPA 19.5 mol %, and IPA 0.5 mol %, and the final temperature of solid state polymerization was selected to 300° C.; then liquid crystalline property was confirmed in a similar manner as above.

Example 1-3: Synthesis of Wholly Aromatic Liquid Crystalline Polyester Resin C

Liquid crystalline polyester resin C was obtained in a similar manner as Example 1-1, except that the monomer feed was changed to HNA 60 mol %, BP 20 mol %, TPA 15.5 mol %, and IPA 4.5 mol %, and the final temperature of solid state polymerization was selected to 300° C.; then liquid crystalline property was confirmed in a similar manner as above.

Example 1-4: Synthesis of Wholly Aromatic Liquid Crystalline Polyester Resin D

Liquid crystalline polyester resin D was obtained in a similar manner as Example 1-1, except that the monomer feed was changed to HNA 70 mol %, BP 15 mol %, TPA 14.5 mol %, and IPA 0.5 mol %, and the final temperature of solid state polymerization was selected to 300° C.; then liquid crystalline property was confirmed in a similar manner as above.

Example 1-5: Synthesis of Wholly Aromatic Liquid Crystalline Polyester Resin E

Liquid crystalline polyester resin E was obtained in a similar manner as Example 1-1, except that the monomer feed was changed to HNA 70 mol %, BP 15 mol %, TPA 13 mol %, and IPA 2 mol %, and the final temperature of solid state polymerization was selected to 300° C.; then liquid crystalline property was confirmed in a similar manner as above.

Example 1-6: Synthesis of Wholly Aromatic Liquid Crystalline Polyester Resin F

Liquid crystalline polyester resin F was obtained in a similar manner as Example 1-1, except that the monomer feed was changed to HNA 60 mol %, BP 20 mol %, TPA 15.5 mol %, and 2,6-naphthalene dicarboxylic acid (NADA) 4.5 mol %, and the final temperature of solid state polymerization was selected to 300° C.; then liquid crystalline property was confirmed in a similar manner as above.

Example 1-7: Synthesis of Wholly Aromatic Liquid Crystalline Polyester Resin G

Liquid crystalline polyester resin G was obtained in a similar manner as Example 1-1, except that the monomer feed was changed to HNA 60 mol %, BP 20 mol %, TPA 18 mol %, and NADA 2 mol %, and the final temperature of solid state polymerization was selected to 300° C.; then liquid crystalline property was confirmed in a similar manner as above.

Example 1-8: Synthesis of Wholly Aromatic Liquid Crystalline Polyester Resin H

Liquid crystalline polyester resin H was obtained in a similar manner as Example 1-1, except that the monomer feed was changed to HNA 60 mol %, BP 20 mol %, TPA 19.5 mol %, and NADA 0.5 mol %, and the final temperature of solid state polymerization was selected to 300° C.; then liquid crystalline property was confirmed in a similar manner as above.

Example 1-9: Synthesis of Wholly Aromatic Liquid Crystalline Polyester Resin I

Liquid crystalline polyester resin I was obtained in a similar manner as Example 1-1, except that the monomer feed was changed to HNA 55 mol %, BP 22.5 mol %, TPA 20.5 mol %, and NADA 2 mol %, and the final temperature of solid state polymerization was selected to 300° C.; then liquid crystalline property was confirmed in a similar manner as above.

Example 1-10: Synthesis of Wholly Aromatic Liquid Crystalline Polyester Resin J

Liquid crystalline polyester resin J was obtained in a similar manner as Example 1-1, except that the monomer feed was changed to HNA 55 mol %, BP 22.5 mol %, TPA 18.5 mol %, and NADA 4.5 mol %, and the final temperature of solid state polymerization was selected to 295° C.; then liquid crystalline property was confirmed in a similar manner as above.

Example 1-11: Synthesis of Wholly Aromatic Liquid Crystalline Polyester Resin K

Liquid crystalline polyester resin K was obtained in a similar manner as Example 1-1, except that the monomer feed was changed to HNA 58 mol %, BP 21 mol %, TPA 16.5 mol %, and NADA 4.5 mol %, and the final temperature of solid state polymerization was selected to 300° C.; then liquid crystalline property was confirmed in a similar manner as above.

Example 1-12: Synthesis of Wholly Aromatic Liquid Crystalline Polyester Resin L

Liquid crystalline polyester resin L was obtained in a similar manner as Example 1-1, except that the monomer feed was changed to HNA 65 mol %, BP 17.5 mol %, TPA 15.5 mol %, and NADA 2 mol %, and the final temperature of solid state polymerization was selected to 300° C.; then liquid crystalline property was confirmed in a similar manner as above.

Comparative Example 1-1: Synthesis of Wholly Aromatic Liquid Crystalline Polyester Resin M Liquid crystalline polyester resin M was obtained in a similar manner as Example 1-1, except that the monomer feed was changed to HNA 60 mol %, BP 20 mol %, TPA 10 mol %, and IPA mol %, and the final temperature of solid state polymerization was selected to 280° C.; then liquid crystalline property was confirmed in a similar manner as above.

Comparative Example 1-2: Synthesis of Wholly Aromatic Liquid Crystalline Polyester Resin N Liquid crystalline polyester resin N was obtained in a similar manner as Example 1-1, except that the monomer feed was changed to HNA 70 mol %, BP 15 mol %, TPA 10 mol %, and IPA mol %, and the final temperature of solid state polymerization was selected to 280° C.; then liquid crystalline property was confirmed in a similar manner as above.

Comparative Example 1-3: Synthesis of Wholly Aromatic Liquid Crystalline Polyester Resin O Liquid crystalline polyester resin O was obtained in a similar manner as Example 1-1, except that the monomer feed was changed to HNA 70 mol %, BP 15 mol %, TPA 5 mol %, and IPA 10 mol %, and the final temperature of solid state polymerization was selected to 280° C.; then liquid crystalline property was confirmed in a similar manner as above.

Comparative Example 1-4: Synthesis of Wholly Aromatic Liquid Crystalline Polyester Resin P Liquid crystalline polyester resin P was obtained in a similar manner as Example 1-1, except that the monomer feed was changed to p-hydroxybenzoic acid (HBA) 60 mol %, BP 20 mol %, TPA 5 mol %, IPA 5 mol %; then liquid crystalline property was confirmed in a similar manner as above.

Comparative Example 1-5: Synthesis of Wholly Aromatic Liquid Crystalline Polyester Resin Q Liquid crystalline polyester resin Q was obtained in a similar manner as Example 1-1, except that the monomer feed was changed to HBA 2 mol %, HNA 48 mol %, BP 25 mol %, and TPA 25 mol %, and the final temperature of solid state polymerization was selected to 280° C.; then liquid crystalline property was confirmed in a similar manner as above.

Comparative Example 1-6: Synthesis of Wholly Aromatic Liquid Crystalline Polyester Resin R Liquid crystalline polyester resin R was obtained in a similar manner as Example 1-1, except that the monomer feed was changed to HNA 60 mol %, BP 20 mol %, TPA 5 mol %, and NADA mol %, and the final temperature of solid state polymerization was selected to 295° C.; then liquid crystalline property was confirmed in a similar manner as above.

«Performance Evaluation»

<Measurement of Dielectric Tangent>

The wholly aromatic liquid crystalline polyester resins obtained by the Examples and Comparative Examples were heat melted at the condition of the melting point to melting point+30° C., and injection molded to prepare flat plate test specimens of 30 mm×30 mm×0.4 mm. The dielectric tangent of frequency of GHz of the in-plane direction of these test specimens were measured by the split post dielectric resonator method (SPDR method) by means of Network Analyzer N5247A from Keysight Technoligies.

<Measurement of Melting Point>

The melting point of the wholly aromatic liquid crystalline polyester resins obtained by the Examples and Comparative Examples by a differential scanning calorimeter (DSC) manufactured by Hitachi High-Tech Science Corporation. The temperature was elevated from room temperature to 360-380° C. at a rate of temperature increase of 10° C./min to melt the polymer completely, and then the temperature was lowered to 30° C. at a rate of 10° C./min, and an endotherm peak obtained when further elevating the temperature to 380° C. at a rate of 10° C./min was determined as the melting point. However, when the endotherm peak at the re-heating was difficult to be detected because it is broad, the peak of the endotherm peak of the first round was determined as the melting point. The measured results are summarized in Table 1.

<Measurement of Volume Expansion Coefficient>

The wholly aromatic liquid crystalline polyester resins obtained from the Examples and Comparative Examples were heat melted at a temperature of the melting point to melting point+30° C. and injection molded to make flat plate test specimens of 30 mm×30 mm×0.4 mm. These flat plate test specimens were cut into a width of 5 mm for tensile mode to prepare strip specimens of 30×5×0.4 mm. The center part of the flat plate test specimen was cut into 7×7 mm for compression mode to prepare plate like specimens of 7×7×0.4 mm.

The volume expansion coefficient (MD line expansion coefficient+TD line expansion coefficient+thickness line expansion coefficient) at 30 to 150° C. of these specimens were measured by using a thermomechanical analysis device (manufactured by Hitachi High-Tech Science Corporation, product name: TMA7000). MD direction and TD direction was evaluated in tensile mode and thickness direction in compression mode. The measured results are summarized in Table 1.

<Measurement of Viscosity>

Melt viscosity at a temperature of the melting point+20° C. of the wholly aromatic liquid crystalline polyester resins obtained from the Examples and Comparative Examples were measured in accordance with JIS K7199 by using a capillary rheometer viscometer (manufactured by Toyo Selki Seisaku-sho., Ltd.). The measured results are summarized in Table 1.

<Measurement of Glass Transition Temperature (Tg)>

The wholly aromatic liquid crystalline polyester resins obtained from the Examples and Comparative Examples were heat melted at a temperature of the melting point to melting point+30° C. and injection molded to make flat plate test specimens of 30 mm×30 mm×0.4 mm. These flat plate test specimens were cut into a width of 8 mm for tensile mode to prepare strip specimens of 30×8×0.4 mm (8 mm in MD direction and 30 mm in TD direction). The glass transition point of the wholly aromatic liquid crystalline polyester resin was obtained from a peak top temperature of tan D obtained by dynamic viscoelasticity measurement in tensile mode by using a dynamic viscoelasticity measurement device (manufactured by Hitachi High-Tech Science Corporation, product name: DMA7100). The measured results are summarized in Table 1.

TABLE 1

| | Composition (mol %) | | | | | | Structural | Performance evaluation | | | | |
|---|---|---|---|---|---|---|---|---|---|---|---|---|
| | Structural unit (I) HNA | Structural unit (II) BP | Structural unit (IIIA) TPA | Structural unit (IIIB) NADA | Structural unit (IIIC) IPA | Other structural unit HBA | unit (IIIA)/ (structural unit (IIIB) + (IIIC)) | Dielectric tangent (×10⁻³) | Melting point (° C.) | Volume expansion coefficient (ppm/° C.) | Melt viscosity in 1000 s⁻¹ (Pa·s) | Tg (° C.) |
| Example1-1 | 60 | 20 | 18 | — | 2 | — | 9.0 | 0.73 | 344 | 244 | 154 | 131 |
| Example1-2 | 60 | 20 | 19.5 | — | 0.5 | — | 39.0 | 0.84 | 353 | 219 | 8 | 130 |
| Example1-3 | 60 | 20 | 15.5 | — | 4.5 | — | 3.4 | 0.73 | 327 | 218 | 421 | 136 |
| Example1-4 | 70 | 15 | 14.5 | — | 0.5 | — | 29.0 | 0.68 | 348 | 205 | 208 | 130 |
| Example1-5 | 70 | 15 | 13 | — | 2 | — | 6.5 | 0.67 | 339 | 232 | 365 | 133 |
| Example1-6 | 60 | 20 | 15.5 | 4.5 | — | — | 3.4 | 0.68 | 320 | 197 | 40 | 134 |
| Example1-7 | 60 | 20 | 18 | 2 | — | — | 9.0 | 0.72 | 337 | 244 | 25 | 132 |
| Example1-8 | 60 | 20 | 19.5 | 0.5 | — | — | 39.0 | 0.80 | 352 | 160 | 7 | 130 |
| Example1-9 | 55 | 22.5 | 20.5 | 2 | — | — | 10.3 | 0.84 | 341 | 233 | 14 | 134 |
| Example1-10 | 55 | 22.5 | 18.5 | 4.5 | — | — | 4.1 | 0.71 | 324 | 221 | 42 | 135 |
| Example1-11 | 58 | 21 | 16.5 | 4.5 | — | — | 3.7 | 0.69 | 321 | 218 | 42 | 135 |
| Example1-12 | 65 | 17.5 | 15.5 | 2 | — | — | 7.8 | 0.70 | 338 | 212 | 32 | 132 |
| Comparative Example1-1 | 60 | 20 | 10 | — | 10 | — | 1.0 | 0.92 | 307 | 213 | 534 | 137 |
| Comparative Example1-2 | 70 | 15 | 10 | — | 5 | — | 2.0 | 0.91 | 313 | 236 | 236 | 132 |
| Comparative Example1-3 | 70 | 15 | 5 | — | 10 | — | 0.5 | 0.84 | 319 | 197 | 627 | 136 |
| Comparative Example1-4 | — | 20 | 15 | — | 5 | 60 | 3.0 | 2.30 | 355 | 276 | 35 | 119 |
| Comparative Example1-5 | 48 | 25 | 25 | — | — | 2 | — | 1.29 | 348 | 210 | 4 | 133 |
| Comparative Example1-6 | 60 | 20 | 5 | 15 | — | — | 0.3 | 2.51 | 285 | 235 | 6 | 122 |

Next, the second embodiment of the present invention will be described in details with the aid of the Examples and Comparative Examples.

Preparation of Wholly Aromatic Liquid Crystalline Polyester Resin

Example 2-1

To a polymerization vessel with a stirring blade, 45 mol % of 6-hydroxy-2-naphthoic acid (HNA), 27.5 mol % of 4,4-dihydroxybiphenyl (BP), 23 mol % of terephthalic acid (TPA), and 4.5 mol % of 2,6-naphthalene dicarboxylic acid (NADA) were added, and potassium acetate and magnesium acetate were feeded as the catalyst, and after carrying out nitrogen substitution by reducing the pressure of the polymerization vessel and injecting nitrogen for 3 times, acetic anhydride (1.08 mol equivalent based on a hydroxyl group) was further added, the temperature elevated to 150° C., and acetylation reaction was performed for 2 hours in a reflux state.

After acetylation has ended, the polymerization vessel in a state of which acetic acid was distilled out was heated at 0.5° C./min, and the polymerization product was taken out when the temperature of the melt product in the vessel reached 300° C., and cooled to solidify. The obtained polymerization product was triturated into the size which will pass through a sieve having a sieve opening of 2.0 mm to obtain a prepolymer.

Then, the prepolymer obtained as above was heated from room temperature to 300° C. over 14 hours by using a heating so machine with an oven manufactured by Yamato Scientific Co., Ltd, and subsequently, the temperature was kept at 300° C. for 2 hours and solid state polymerization was performed. Subsequently, heat was naturally released at room temperature to obtain wholly aromatic liquid crystalline polyester resin A. Wholly aromatic liquid crystalline polyester resin A specimen was heat melted on a microscope heating stage by using a polarization microscope manufactured by Olympus Corporation (product name: BH-2) with a hot stage for microscopes manufactured by Mettler (product name: FP82HT) to confirm liquid crystallinity by the presence/absence of optical anisotropy.

Example 2-2

A liquid crystalline polyester resin was obtained in a similar manner as Example 2-1, except that the monomer feed was changed to HNA 45 mol %, BP 27.5 mol %, TPA 21.5 mol %, and NADA 6 mol %; then liquid crystalline property was confirmed in a similar manner as above.

Example 2-3

A liquid crystalline polyester resin was obtained in a similar manner as Example 2-1, except that the monomer feed was changed to HNA 45 mol %, BP 27.5 mol %, TPA 19.5 mol %, and NADA 8 mol %; then liquid crystalline property was confirmed in a similar manner as above.

Example 2-4

A liquid crystalline polyester resin was obtained in a similar manner as Example 2-1, except that the monomer feed was changed to HNA 50 mol %, BP 25 mol %, TPA 22 mol %, and NADA so 3 mol %, and the final temperature of solid state polymerization was selected to 310° C. and the retention time to 1 hour; then liquid crystalline property was confirmed in a similar manner as above.

Example 2-5

A liquid crystalline polyester resin was obtained in a similar manner as Example 2-1, except that the monomer feed was changed to HNA 50 mol %, BP 25 mol %, TPA 20.5 mol %, and NADA 4.5 mol %; then liquid crystalline property was confirmed in a similar manner as above.

Example 2-6

A liquid crystalline polyester resin was obtained in a similar manner as Example 2-1, except that the monomer feed was changed to HNA 50 mol %, BP 25 mol %, TPA 19 mol % and NADA 6 mol %; then liquid crystalline property was confirmed in a similar manner as above.

Example 2-7

A liquid crystalline polyester resin was obtained in a similar manner as Example 2-1, except that the monomer feed was changed to HNA 50 mol %, BP 25 mol %, TPA 17 mol %, and NADA 8 mol %; then liquid crystalline property was confirmed in a similar manner as above.

Example 2-8

A liquid crystalline polyester resin was obtained in a similar manner as Example 2-1, except that the monomer feed was changed to HNA 50 mol %, BP 25 mol %, TPA 18.5 mol %, NADA 4.5 mol %, and isophthalic acid (IPA) 2 mol %; then liquid crystalline property was confirmed in a similar manner as above.

Example 2-9

A liquid crystalline polyester resin was obtained in a similar manner as Example 2-1, except that the monomer feed was changed to HNA 50 mol %, BP 25 mol %, TPA 15 mol %, NADA 8 mol %, and IPA 2 mol %; then liquid crystalline property was confirmed in a similar manner as above.

Example 2-10

A liquid crystalline polyester resin was obtained in a similar manner as Example 2-1, except that the monomer feed was changed to HNA 52 mol %, BP 24 mol %, TPA 21 mol %, NADA 2 mol %, and IPA 1 mol %; then liquid crystalline property was confirmed in a similar manner as above.

Example 2-11

A liquid crystalline polyester resin was obtained in a similar manner as Example 2-1, except that the monomer feed was changed to HNA 52 mol %, BP 24 mol %, TPA 20 mol %, NADA 3 mol %, and IPA 1 mol %; then liquid crystalline property was confirmed in a similar manner as above.

Example 2-12

A liquid crystalline polyester resin was obtained in a similar manner as Example 2-1, except that the monomer

Example 2-13

A liquid crystalline polyester resin was obtained in a similar manner as Example 2-1, except that the monomer feed was changed to HNA 55 mol %, BP 22.5 mol %, TPA 16.5 mol %, and NADA 6 mol %; then liquid crystalline property was confirmed in a similar manner as above.

Example 2-14

A liquid crystalline polyester resin was obtained in a similar manner as Example 2-1, except that the monomer feed was changed to HNA 55 mol %, BP 22.5 mol %, TPA 14.5 mol %, and NADA 8 mol %; then liquid crystalline property was confirmed in a similar manner as above.

Example 2-15

A liquid crystalline polyester resin was obtained in a similar manner as Example 2-1, except that the monomer feed was changed to HNA 55 mol %, BP 22.5 mol %, TPA 18 mol %, NADA 3.5 mol %, and IPA 1 mol %; then liquid crystalline property was confirmed in a similar manner as above.

Example 2-16

A liquid crystalline polyester resin was obtained in a similar manner as Example 2-1, except that the monomer feed was changed to HNA 55 mol %, BP 22.5 mol %, TPA 17 mol %, NADA 4.5 mol %, and IPA 1 mol %; then liquid crystalline property was confirmed in a similar manner as above.

Example 2-17

A liquid crystalline polyester resin was obtained in a similar manner as Example 2-1, except that the monomer feed was changed to HNA 55 mol %, BP 22.5 mol %, TPA 18 mol %, NADA 2.5 mol %, and IPA 2 mol %; then liquid crystalline property was confirmed in a similar manner as above.

Example 2-18

A liquid crystalline polyester resin was obtained in a similar manner as Example 2-1, except that the monomer feed was changed to HNA 55 mol %, BP 22.5 mol %, TPA 16 mol %, NADA 4.5 mol %, and IPA 2 mol %; then liquid crystalline property was confirmed in a similar manner as above.

Example 2-19

A liquid crystalline polyester resin was obtained in a similar manner as Example 2-1, except that the monomer feed was changed to HNA 58 mol %, BP 21 mol %, TPA 16.5 mol %, and NADA 4.5 mol %; then liquid crystalline property was confirmed in a similar manner as above.

Example 2-20

A liquid crystalline polyester resin was obtained in a similar manner as Example 2-1, except that the monomer feed was changed to HNA 60 mol %, BP 20 mol %, TPA 17 mol %, and NADA 3 mol %; then liquid crystalline property was confirmed in a similar manner as above.

Example 2-21

A liquid crystalline polyester resin was obtained in a similar manner as Example 2-1, except that the monomer feed was changed to HNA 60 mol %, BP 20 mol %, TPA 15.5 mol %, and NADA 4.5 mol %; then liquid crystalline property was confirmed in a similar manner as above.

Example 2-22

A liquid crystalline polyester resin was obtained in a similar manner as Example 2-1, except that the monomer feed was changed to HNA 60 mol %, BP 20 mol %, TPA 15 mol %, and NADA mol %; then liquid crystalline property was confirmed in a similar manner as above.

Example 2-23

A liquid crystalline polyester resin was obtained in a similar manner as Example 2-1, except that the monomer feed was changed to HNA 60 mol %, BP 20 mol %, TPA 14 mol %, and NADA 6 mol %; then liquid crystalline property was confirmed in a similar manner as above.

Example 2-24

A liquid crystalline polyester resin was obtained in a similar manner as Example 2-1, except that the monomer feed was changed to HNA 60 mol %, BP 20 mol %, TPA 12 mol %, and NADA 8 mol %; then liquid crystalline property was confirmed in a similar manner as above.

Example 2-25

A liquid crystalline polyester resin was obtained in a similar manner as Example 2-1, except that the monomer feed was changed to HNA 60 mol %, BP 20 mol %, TPA 11 mol %, and NADA 9 mol %; then liquid crystalline property was confirmed in a so similar manner as above.

Example 2-26

A liquid crystalline polyester resin was obtained in a similar manner as Example 2-1, except that the monomer feed was changed to HNA 60 mol %, BP 20 mol %, TPA 15.5 mol %, NADA 2.5 mol %, and IPA 2 mol %; then liquid crystalline property was confirmed in a similar manner as above.

Example 2-27

A liquid crystalline polyester resin was obtained in a similar manner as Example 2-1, except that the monomer feed was changed to HNA 65 mol %, BP 17.5 mol %, TPA 15.5 mol %, and NADA 2 mol %; then liquid crystalline property was confirmed in a similar manner as above.

Example 2-28

A liquid crystalline polyester resin was obtained in a similar manner as Example 2-1, except that the monomer feed was changed to HNA 65 mol %, BP 17.5 mol %, TPA 13 mol %, and NADA 4.5 mol %; then liquid crystalline property was confirmed in a similar manner as above.

Example 2-29

A liquid crystalline polyester resin N was obtained in a similar manner as Example 2-1, except that the monomer feed was changed to HNA 65 mol %, BP 17.5 mol %, TPA 8.5 mol %, and NADA 9 mol %; then liquid crystalline property was confirmed in a similar manner as above.

Example 2-30

A liquid crystalline polyester resin was obtained in a similar manner as Example 2-1, except that the monomer feed was changed to HNA 70 mol %, BP 15 mol %, TPA 12 mol %, and NADA 3 mol %; then liquid crystalline property was confirmed in a similar manner as above.

Example 2-31

A liquid crystalline polyester resin was obtained in a similar manner as Example 2-1, except that the monomer feed was changed to HNA 70 mol %, BP 15 mol %, TPA 8 mol %, and NADA 7 mol %; then liquid crystalline property was confirmed in a similar manner as above.

Example 2-32

A liquid crystalline polyester resin was obtained in a similar manner as Example 2-1, except that the monomer feed was changed to HNA 70 mol %, BP 15 mol %, TPA 6 mol %, NADA 9 mol %; then liquid crystalline property was confirmed in a similar manner as above.

Comparative Example 2-1

A liquid crystalline polyester resin was obtained in a similar manner as Example 2-1, except that the monomer feed was changed to HNA 30 mol %, BP 35 mol %, TPA 30.5 mol %, and NADA 4.5 mol %, and the final temperature of solid state polymerization was selected to 295° C. and the retention time to 1 hour; then liquid crystalline property was confirmed in a similar manner as above.

Comparative Example 2-2

A liquid crystalline polyester resin was obtained in a similar manner as Example 2-1, except that the monomer feed was changed to HNA 50 mol %, BP 25 mol %, TPA 10 mol %, and NADA mol %; then liquid crystalline property was confirmed in a similar manner as above.

Comparative Example 2-3

A liquid crystalline polyester resin was obtained in a similar manner as Example 2-1, except that the monomer feed was changed to HNA 55 mol %, BP 22.5 mol %, TPA 12.5 mol %, and NADA 10 mol %, and the final temperature of solid state polymerization was selected to 295° C. and the retention time to 1 hour; then liquid crystalline property was confirmed in a similar manner as above.

Comparative Example 2-4

A liquid crystalline polyester resin was obtained in a similar manner as Example 2-1, except that the monomer feed was changed to HNA 60 mol %, BP 20 mol %, TPA 10 mol %, and NADA mol %; then liquid crystalline property was confirmed in a similar manner as above.

Comparative Example 2-5

A liquid crystalline polyester resin was obtained in a similar manner as Example 2-1, except that the monomer feed was changed to HNA 60 mol %, BP 20 mol %, TPA 5 mol %, and NADA mol %, and the final temperature of solid state polymerization was selected to 295° C. and the retention time to 1 hour; then liquid crystalline property was confirmed in a similar manner as above.

Comparative Example 2-6

A liquid crystalline polyester resin was obtained in a similar manner as Example 2-1, except that the monomer feed was changed to HNA 65 mol %, BP 17.5 mol %, TPA 2.5 mol %, and NADA 15 mol %; then liquid crystalline property was confirmed in a similar manner as above.

Comparative Example 2-7

A liquid crystalline polyester resin was obtained in a similar manner as Example 2-1, except that the monomer feed was changed to BP 20 mol %, TPA 15 mol %, p-hydroxybenzoic acid (HBA) 60 mol %, and IPA 5 mol %; then liquid crystalline property was confirmed in a similar manner as above.

Comparative Example 2-8

A liquid crystalline polyester resin was obtained in a similar manner as Example 2-1, except that the monomer feed was changed to HNA 27 mol % and HBA 73 mol %, and the final temperature of solid state polymerization was selected to 270° C.; then liquid crystalline property was confirmed in a similar manner as above.

«Performance Evaluation»

<Measurement of Melt Elongation Property-Melt Tensile Force>

Melt elongation property of the wholly aromatic liquid crystalline polyester resins obtained by the Examples and Comparative Examples was evaluated by measuring the elongation ratio of the melt strands. In particular, the wholly aromatic liquid crystalline polyester resin was melted under the conditions in which the temperature was the melting point of the liquid crystalline polyester resin+20° C. and the extrusion rate of the plunger was 82.3 mm/min (=an extrusion rate when the shear rate applied to the resin when passing capillary is 1000 s$^{-1}$) by using CAPILOGRAPH 1D manufactured by Toyo Seiki Seisaku-sho., Ltd. (a rheometer with a barrel inner diameter of 9.55 mm), capillary with inner diameter of 1 mm, and extruded as a strand. The extruded melt strand was withdrawn with a wind-up roller via a pulley to measure the elongation ratio (=withdrawing rate at the end of measurement (m/min)/extrusion rate converted into the time when passing the capillary (m/min)). With respect to the withdrawing rate, the initial rate was 40 m/min which was increased at the rate of 400 m/min$^2$, and the end of measurement was when the withdrawing rate reached 200 m/min, which was the measuring limit of the device, or when the melt strand fractured. These measured results are summarized in Tables 2 and 3. Also, the tensile force (=melt tensile force) of the melt strands at the end of measurement is summarized in Tables 2 and 3. Those of which the melt strand could not be appropriately set up on the series of pulley and the wind-up roller due to lack of the melt elongation property, melt viscosity, or melt tensile force, or which measurement was not possible because the melt elongation property was below the measuring limit of the device was marked as "-".

<Measurement of Dielectric Tangent (10 GHz)>

The wholly aromatic liquid crystalline polyester resins obtained from the Examples and Comparative Examples were heat melted at a condition in which the temperature was from the melting point to melting point+30° C. and injection molded to make flat plate test specimens of 30 mm×30 mm×0.4 mm. With respect to the dielectric tangent in the in-plane direction of these specimens, dielectric tangent of frequency of 10 GHz was measured by a split post dielectric resonator method (SPDR method), using Network Analyzer N5247A from Keysight Technoligies.

<Measurement of Dielectric Tangent (82 GHz Etc.,)>

The wholly aromatic liquid crystalline polyester resins obtained from Example 2-22 and Comparative Examples 2-7 and 2-8 were heat melted at a condition in which the temperature was from the melting point to melting point+30° C. and injection molded to make flat plate samples of 30 mm×30 mm×0.4 mm. Subsequently, square flat plates in 13 mm square were cut from the center of these flat plate samples to make test specimens. These test specimens were loaded on to a resonator for 100 GHz at Graduate School of Engineering, Utsunomiya University, Kogami Lab. & Shimizu Lab., and by cylindrical cavity resonator method, the dielectric tangent of frequency of 82 GHz was measured at room temperature. (Although a resonator for 100 GHz was used, the actual measurement frequency was at around 82 GHz from the resonance property of the material). The measured results are summarized in Table 4. Also, the dielectric tangent measured at various frequencies in the similar procedure by using a cylindrical cavity resonator with different set up frequencies is shown in FIG. 1.

<Measurement of Dielectric Tangent (Temperature Dependency in GHz Area)>

Figure 2:
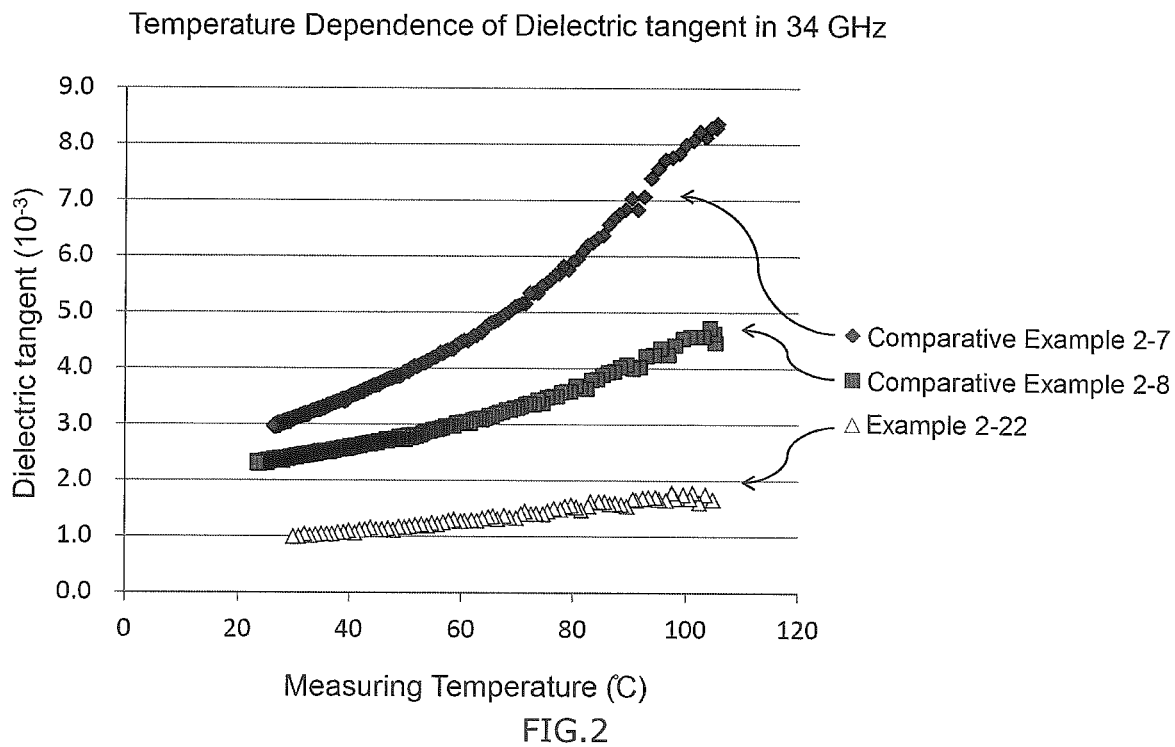
FIG. 2 shows the measured result of the dielectric tangent in 34 GHz of the wholly aromatic polyester resin of the second aspect (temperature dependency from 30° C. to 100° C.).

The wholly aromatic liquid crystalline polyester resins obtained from Example 2-22 and Comparative Examples 2-7 and 2-8 were heat melted at a condition in which the temperature was from the melting point to melting point+30° C. and injection molded to make flat plate samples of 30 mm×30 mm×0.4 mm. Subsequently, square flat plates in 13 mm square were cut from the center of these flat plate samples to make test specimens. These test specimens were loaded on to a resonator for 36 GHz at Graduate School of Engineering Utsunomiya University, Kogami Lab. & Shimizu Lab., and by cylindrical cavity resonator method, the dielectric tangent of frequency of 34 GHz was measured while changing the measuring temperature. (Although a resonator for 36 GHz was used, the actual measurement frequency was at 34 GHz from the resonance property of the material). The measuring method in details is as follows. The resonator to which the specimen was set was arranged in a constant-temperature tank, and after setting the set-up temperature of the constant-temperature tank to 105° C., 2 hours elapsed. Thereafter, the constant-temperature tank was set to 20° C. and the temperature inside the tank was left to naturally fall, and the dielectric tangent was measured at this time every 1° C. The results are shown in FIG. 2. Further, the dielectric tangent at 30° C. and 100° C. and the rate of change of dielectric tangent from 30° C. to 100° C. are shown in Table 5.

<Measurement of Melting Point>

The melting points of the wholly aromatic liquid crystalline polyester resins obtained by the Examples and Comparative Examples were measured by a differential scanning calorimeter (DSC) manufactured by Hitachi High-Tech Science Corporation. The temperature was elevated from room temperature to 360-380° C. at a rate of temperature increase of 10° C./min to melt the polymer completely, and then the temperature was lowered to 30° C. at a rate of 10° C./min, and an endotherm peak obtained when further elevating the temperature to 380° C. at a rate of 10° C./min was determined as the melting point ($Tm_2$). However, when the endotherm peak at the re-heating was difficult to be detected because it is broad, the peak of the endotherm peak of the first round ($Tm_1$) was determined as the melting point (C). The measured results are summarized in Tables 2 and 3.

<Measurement of Melt Viscosity>

The melt viscosity (Pa·s) at the temperature of the melting point+20° C. in a shear rate of 1000 $s^{-1}$ of the wholly aromatic liquid crystalline polyester resins obtained by the Examples and Comparative Examples were measured in accordance with JIS K7199 by using a capillary rheometer viscometer (CAPILOGRAPH 1D manufactured by Toyo Selki Seisaku-sho., Ltd.) and capillary with inner diameter of 1 mm. The measured results are summarized in Tables 2 and 3.

TABLE 2

| | Composition (mol %) | | | | | | Performance evaluation | | | | |
|---|---|---|---|---|---|---|---|---|---|---|---|
| | Structural unit (I) HNA | Structural unit (II) BP | Structural unit (IIIA) TPA | Structural unit (IIIAB) NADA | Structural unit (IIIC) IPA | Other structural unit HBA | Melt elongation property (elongation ratio) | Melt tensile force (mN) | Dielectric tangent ($\times 10^{-3}$) | Melting point (° C.) | Melt viscosity (Pa·s) |
| Example 2-1 | 45 | 27.5 | 23 | 4.5 | — | — | 27 | 1 | 0.82 | 333 | 14 |
| Example 2-2 | 45 | 27.5 | 21.5 | 6 | — | — | 27 | 2 | 0.78 | 325 | 24 |
| Example 2-3 | 45 | 27.5 | 19.5 | 8 | — | — | 27 | 4.1 | 0.73 | 320 | 37 |
| Example 2-4 | 50 | 25 | 22 | 3 | — | — | 22 | 7 | 0.71 | 341 | 42 |
| Example 2-5 | 50 | 25 | 20.5 | 4.5 | — | — | 23 | 2 | 0.75 | 332 | 20 |
| Example 2-6 | 50 | 25 | 19 | 6 | — | — | 27 | 3 | 0.71 | 323 | 35 |
| Example 2-7 | 50 | 25 | 17 | 8 | — | — | 27 | 10 | 0.67 | 311 | 53 |

TABLE 2-continued

| | Composition (mol %) | | | | | | Performance evaluation | | | | |
|---|---|---|---|---|---|---|---|---|---|---|---|
| | Structural unit (I) HNA | Structural unit (II) BP | Structural unit (IIIA) TPA | Structural unit (IIIAB) NADA | Structural unit (IIIC) IPA | Other structural unit HBA | Melt elongation property (elongation ratio) | Melt tensile force (mN) | Dielectric tangent (×10⁻³) | Melting point (° C.) | Melt viscosity (Pa · s) |
| Example 2-8 | 50 | 25 | 18.5 | 4.5 | 2 | — | 21 | 11 | 0.72 | 320 | 69 |
| Example 2-9 | 50 | 25 | 15 | 8 | 2 | — | 10 | 20 | 0.69 | 301 | 99 |
| Example 2-10 | 52 | 24 | 21 | 2 | 1 | — | 22 | 2 | 0.78 | 340 | 22 |
| Example 2-11 | 52 | 24 | 20 | 3 | 1 | — | 25 | 3 | 0.73 | 334 | 27 |
| Example 2-12 | 55 | 22.5 | 18 | 4.5 | — | — | 27 | 5 | 0.68 | 324 | 33 |
| Example 2-13 | 55 | 22.5 | 16.5 | 6 | — | — | 27 | 10 | 0.62 | 317 | 53 |
| Example 2-14 | 55 | 22.5 | 14.5 | 8 | — | — | 21 | 14 | 0.65 | 307 | 60 |
| Example 2-15 | 55 | 22.5 | 18 | 3.5 | 1 | — | 27 | 8 | 0.66 | 326 | 53 |
| Example 2-16 | 55 | 22.5 | 17 | 4.5 | 1 | — | 27 | 11 | 0.67 | 320 | 61 |
| Example 2-17 | 55 | 22.5 | 18 | 2.5 | 2 | — | 27 | 13 | 0.70 | 328 | 55 |
| Example 2-18 | 55 | 22.5 | 16 | 4.5 | 2 | — | 16 | 27 | 0.66 | 314 | 90 |
| Example 2-19 | 58 | 21 | 16.5 | 4.5 | — | — | 27 | 6 | 0.69 | 321 | 42 |
| Example 2-20 | 60 | 20 | 17 | 3 | — | — | 27 | 8 | 0.62 | 331 | 35 |
| Example 2-21 | 60 | 20 | 15.5 | 4.5 | — | — | 27 | 6 | 0.68 | 320 | 40 |
| Example 2-22 | 60 | 20 | 15 | 5 | — | — | 27 | 6 | 0.73 | 316 | 41 |
| Example 2-23 | 60 | 20 | 14 | 6 | — | — | 27 | 11 | 0.68 | 313 | 53 |
| Example 2-24 | 60 | 20 | 12 | 8 | — | — | 27 | 9 | 0.66 | 308 | 56 |
| Example 2-25 | 60 | 20 | 11 | 9 | — | — | 27 | 4 | 0.65 | 308 | 31 |
| Example 2-26 | 60 | 20 | 15.5 | 2.5 | 2 | — | 22 | 21 | 0.63 | 328 | 74 |
| Example 2-27 | 65 | 17.5 | 15.5 | 2 | — | — | 27 | 6 | 0.70 | 338 | 32 |
| Example 2-28 | 65 | 17.5 | 13 | 4.5 | — | — | 27 | 15 | 0.57 | 320 | 56 |
| Example 2-29 | 65 | 17.5 | 8.5 | 9 | — | — | 27 | 17 | 0.56 | 312 | 83 |
| Example 2-30 | 70 | 15 | 12 | 3 | — | — | 27 | 12 | 0.55 | 332 | 48 |
| Example 2-31 | 70 | 15 | 8 | 7 | — | — | 17 | 23 | 0.53 | 319 | 87 |
| Example 2-32 | 70 | 15 | 6 | 9 | — | — | 22 | 23 | 0.53 | 320 | 85 |

※Value of Tm₁ is described.

TABLE 3

| | Composition (mol %) | | | | | | Performance evaluation | | | | |
|---|---|---|---|---|---|---|---|---|---|---|---|
| | Structural unit (I) HNA | Structural unit (II) BP | Structural unit (IIIA) TPA | Structural unit (IIIB) NADA | Structural unit (IIIC) IPA | Other structural unit HBA | Melt elongation property (elongation ratio) | Melt tensile force (mN) | Dielectric tangent (×10⁻³) | Melting point (° C.) | Melt viscosity (Pa · s) |
| Comparative Example 2-1 | 30 | 35 | 30.5 | 4.5 | — | — | — | — | 2.21 | 327 | 66 |
| Comparative Example 2-2 | 50 | 25 | 10 | 15 | — | — | — | — | 3.03 | 276 | 5 |
| Comparative Example 2-3 | 55 | 22.5 | 12.5 | 10 | — | — | — | — | 1.11 | 298 | 13 |
| Comparative Example 2-4 | 60 | 20 | 10 | 10 | — | — | — | — | 0.58 | 306 | 89 |

TABLE 3-continued

| | Composition (mol %) | | | | | | Performance evaluation | | | | |
|---|---|---|---|---|---|---|---|---|---|---|---|
| | Structural unit (I) HNA | Structural unit (II) BP | Structural unit (IIIA) TPA | Structural unit (IIIB) NADA | Structural unit (IIIC) IPA | Other structural unit HBA | Melt elongation property (elongation ratio) | Melt tensile force (mN) | Dielectric tangent (×10$^{-3}$) | Melting point (° C.) | Melt viscosity (Pa·s) |
| Comparative Example 2-5 | 60 | 20 | 5 | 15 | — | — | — | — | 2.51 | 286 | 6 |
| Comparative Example 2-6 | 65 | 17.5 | 2.5 | 15 | — | — | — | — | 1.20 | 309 | 8 |
| Comparative Example 2-7 | — | 20 | 15 | — | 5 | 60 | — | — | 2.30 | 355 | 35 |
| Comparative Example 2-8 | 27 | — | — | — | — | 73 | 27 | 25 | 1.70 | 289 | 72 |

TABLE 4

| | Dielectric tangent (×10$^{-3}$) [82 GHz] |
|---|---|
| Example 2-22 | 2.1 |
| Comparative Example 2-8 | 4.4 |
| Comparative Example 2-9 | 3.7 |

TABLE 5

| | Dielectric tangent (×10$^{-3}$) [34 GHz] | | Rate of change between 30° C. and 100° C. dielectric tangent [34 GHz] |
|---|---|---|---|
| | 30° C. | 100° C. | (×10$^{-5}$/° C.) |
| Example 2-22 | 1.0 | 1.8 | 1.0 |
| Comparative Example 2-8 | 3.1 | 8.0 | 7.0 |
| Comparative Example 2-9 | 2.4 | 4.6 | 3.0 |

The invention claimed is:

1. A wholly aromatic liquid crystalline polyester resin comprising,
structural unit (I) derived from 6-hydroxy-2-naphthoic acid,
structural unit (II) derived from an aromatic diol compound,
structural unit (III) derived from an aromatic dicarboxylic compound, wherein
structural unit (III) comprises structural unit (III A) derived from terephthalic acid, and structural unit (III B) derived from 2,6-naphthalene dicarboxylic acid, wherein
the composition ratio (mol %) of said structural units satisfies the following conditions:
45 mol %≤structural unit (I)≤7580 mol %
12 mol %≤structural unit (II)≤27.5 mol %
3 mol %≤structural unit (III A)≤25 mol %
2 mol %≤structural unit (III B)≤9 mol %
the dielectric tangent in measurement frequency 10 GHz is 0.85×10$^{-3}$ or lower, and
the melt tensile force at a measurement end point of the melt strand that was extruded under the conditions of the melting point of the liquid crystalline polyester resin +20° C. and shear rate of 1000 s$^{-1}$ is 3 mN or more.

2. The wholly aromatic liquid crystalline polyester resin according to claim 1, wherein
the composition ratio (mol %) of the structural units further satisfies the following conditions:
50 mol %≤structural unit (I)≤70 mol %
15 mol %≤structural unit (II)≤27 mol %
6 mol %≤structural unit (III A)≤24 mol %
3 mol %≤structural unit (III B)≤9 mol %.

3. The wholly aromatic liquid crystalline polyester resin according to claim 1, wherein
said structural unit (II) is represented by the following formula:

$$\text{―}(\text{―O―Ar}^1\text{―O―})\text{―} \qquad (II)$$

wherein Ar$^1$ is selected from the group consisting of phenyl, biphenyl, naphtyl, anthryl, and phenanthryl, optionally having a substituent group.

4. The wholly aromatic liquid crystalline polyester resin according to claim 1, wherein
the melting point is 300° C. or more.

5. The wholly aromatic liquid crystalline polyester resin according to claim 1, wherein
the elongation ratio of a melt strand extruded under the conditions of melting point of the liquid crystalline polyester resin+20° C. and shear rate of 1000 s$^{-1}$ is 10 times or more.

6. The wholly aromatic liquid crystalline polyester resin according to claim 1, wherein
the dielectric tangent in measurement frequency 82 GHz is less than 3.5×10$^{-3}$.

7. The wholly aromatic liquid crystalline polyester resin according to claim 1, wherein
the dielectric tangents of 30° C. and 100° C. in measurement frequency 34 GHz are less than 2.0×10$^{-3}$ and less than 4.0×10$^{-3}$ respectively.

8. The wholly aromatic liquid crystalline polyester resin according to claim 1, wherein
the rate of change of dielectric tangent from 30° C. to 100° C. in measurement frequency 34 GHz is less than 3.0×10$^{-5}$/° C.

9. The wholly aromatic liquid crystalline polyester resin according to claim 1, wherein
the melt viscosity at the melting point of the liquid crystalline polyester resin+20° C. and shear rate of 1000 s$^{-1}$ is from 20 to 100 Pa·s.

10. A molded article comprising the wholly aromatic liquid crystalline polyester resin according to claim 1.

11. The molded article according to claim 10, wherein the molded article is in a film form.

12. The molded article according to claim 10, wherein the molded article is in a fiber form.

13. The molded article according to claim 10, wherein the molded article is an injection molded article.

14. Electric and electronic components comprising the molded article according to claim 10.

* * * * *